US009426068B2

(12) United States Patent
Dunbar et al.

(10) Patent No.: US 9,426,068 B2
(45) Date of Patent: Aug. 23, 2016

(54) BALANCING OF FORWARDING AND ADDRESS RESOLUTION IN OVERLAY NETWORKS

(71) Applicant: Futurewei Technologies, Inc., Plano, TX (US)

(72) Inventors: Linda Dunbar, Plano, TX (US); XiaoRong Qu, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 731 days.

(21) Appl. No.: 13/775,044

(22) Filed: Feb. 22, 2013

(65) Prior Publication Data

US 2013/0227108 A1 Aug. 29, 2013

Related U.S. Application Data

(60) Provisional application No. 61/602,935, filed on Feb. 24, 2012.

(51) Int. Cl.
*H04L 12/741* (2013.01)
*H04L 12/46* (2006.01)
*H04L 29/12* (2006.01)
(Continued)

(52) U.S. Cl.
CPC ............ *H04L 45/745* (2013.01); *H04L 12/46* (2013.01); *H04L 12/462* (2013.01); *H04L 12/4633* (2013.01); *H04L 45/74* (2013.01);
(Continued)

(58) Field of Classification Search
CPC . H04L 61/10; H04L 61/103; H04L 61/6018; H04L 45/30; H04L 45/306; H04L 45/745; H04L 45/74; H04L 45/64; H04L 41/12; H04L 12/46; H04L 12/462; H04L 12/4625; H04L 12/4641
See application file for complete search history.

(56) References Cited

U.S. PATENT DOCUMENTS 6,832,304 B2 * 12/2004 Rangarajan ......... G06F 12/0692
711/202
7,143,188 B2 * 11/2006 Maufer .................. H04L 61/10
709/245

(Continued)

FOREIGN PATENT DOCUMENTS

WO 2009018127 A1 2/2009
WO 2012006190 A1 1/2012

OTHER PUBLICATIONS

Foreign Communication From a Counterpart Application, European Application No. 13709635.0, European Office Action dated Jul. 10, 2015, 19 pages.

(Continued)

*Primary Examiner* — Ramy M Osman
(74) *Attorney, Agent, or Firm* — Conley Rose, P.C.; Grant Rodolph; Adam J. Stegge

(57) ABSTRACT

A network node comprising a processor configured to maintain a plurality of mapping entries for one or more virtual network instances, receive a data packet within a first virtual network instance, wherein the data packet comprises an inner destination address, match the inner destination address with one of the mapping entries, obtain an outer destination address that corresponds to the matched mapping entry, encapsulate the data packet with the outer destination address, and forward the encapsulated data packet based on the outer destination address, wherein the mapping entries maps out all of the addresses for a plurality of end nodes that participate in the first virtual network instance.

20 Claims, 10 Drawing Sheets

(51) Int. Cl.
*H04L 12/715* (2013.01)
*H04L 12/751* (2013.01)

(52) U.S. Cl.
CPC ....... *H04L61/6018* (2013.01); *H04L 12/4641* (2013.01); *H04L 45/02* (2013.01); *H04L 45/64* (2013.01)

(56) References Cited

U.S. PATENT DOCUMENTS

| | | | | |
|---|---|---|---|---|
| 7,656,792 | B2* | 2/2010 | Zhang | H04L 12/1877 370/228 |
| 8,166,205 | B2* | 4/2012 | Farinacci | H04L 12/4641 370/389 |
| 8,937,950 | B2* | 1/2015 | Dunbar | H04L 45/74 370/392 |
| 9,160,609 | B2* | 10/2015 | Dunbar | H04L 12/462 |
| 9,225,597 | B2* | 12/2015 | Tubaltsev | H04L 45/02 |
| 2003/0031190 | A1* | 2/2003 | Ohnishi | H04L 12/462 370/401 |
| 2003/0225909 | A1* | 12/2003 | Glasco | G06F 15/17381 709/245 |
| 2003/0225938 | A1* | 12/2003 | Glasco | G06F 15/17381 713/375 |
| 2004/0184408 | A1* | 9/2004 | Liu | H04L 61/6022 370/236 |
| 2006/0259734 | A1* | 11/2006 | Sheu | G06F 12/1036 711/203 |
| 2009/0037607 | A1* | 2/2009 | Farinacci | H04L 61/103 709/249 |
| 2010/0014517 | A1* | 1/2010 | Huang | H04W 36/0033 370/389 |
| 2011/0317703 | A1 | 12/2011 | Dunbar et al. | |
| 2014/0351106 | A1* | 11/2014 | Furr | H04L 12/1403 705/34 |

OTHER PUBLICATIONS

Foreign Communication From a Counterpart Application, PCT Application No. PCT/US2013/027508, International Search Report dated Aug. 1, 2013, 7 pages.

Foreign Communication From a Counterpart Application, PCT Application No. PCT/US2013/027508, Written Opinion dated Aug. 1, 2013, 13 pages.

Thaler, D., et al, "Multipath Issues in Unicast and Multicast Next-Hop Selection," RFC 2991, Nov. 2000, 10 pages.

Hopps, C., "Analysis of an Equal-Cost Multi-Path Algorithm," RFC 2992, Nov. 2000, 9 pages.

Kompella, K., et al., "Detecting Multi-Protocol Label Switched (MPLS) Data Plane Failures," RFC 4379, Feb. 2006, 51 pages.

Grover, H., et al., "Overlay Transport Virtualization," draft-hasmit-otv-00, Oct. 15, 2010, 17 pages.

Foreign Communication From a Counterpart Application, PCT Application PCT/US2013/027508, Partial Search Report; Invitation to Pay Fees dated on May 27, 2013, 8 pages.

* cited by examiner

900

| 902 | 904 | 906 | 908 |

| Virtual Network Instance ID | Designated Directory Node Address | Capability | Priority |
|---|---|---|---|
| Virtual Network Instance #1 | Designated Directory Node Address A | Must maintain | High Priority |
| | Designated Directory Node Address B | Must maintain | High Priority |
| | Designated Directory Node Address C | Optional to maintain | Medium priority |

| 1002 | 1004 | 1006 | 1008 |

| Designated Directory Node Address | Virtual network instance list | Capability | Weight |
|---|---|---|---|
| Designated Directory Node Address B | Virtual Network #1 | Forward & Provide mapping information | 50% |
| | Virtual Network #2 | Forward | 40% |
| | Virtual Network #3 | Forward | 10% |

*FIG. 10*

BALANCING OF FORWARDING AND ADDRESS RESOLUTION IN OVERLAY NETWORKS

CROSS-REFERENCE TO RELATED APPLICATIONS

The present application claims priority to U.S. Provisional Patent Application No. 61/602,935 filed Feb. 24, 2012 by Linda Dunbar, et al. and entitled "Balancing of Forwarding and Address Resolution in Overlay Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual and overlay network technology has significantly improved the implementation of communication and data networks in terms of efficiency, cost, and processing power. An overlay network may be a virtual environment built on top of an underlay network. Nodes within the overlay network may be connected via virtual and/or logical links that may correspond to nodes and physical links in the underlay network. The overlay network may be partitioned into virtual network instances (e.g. Internet Protocol (IP) subnets) that may simultaneously execute different applications and services using the underlay network. Furthermore, virtual resources, such as computational, storage, and/or network elements may be flexibly redistributed or moved throughout the overlay network. For instance, hosts and virtual machines (VMs) within a data center may migrate to any virtualized server with available resources to perform applications and services. As a result, virtual and overlay network technology has been central to improving today's communication and data network by reducing network overhead while improving network throughput.

Unfortunately, many of today's networks are large and complex such that the networks comprise a massive number of end nodes (e.g. hosts and VMs) which may not be placed based on their address prefix (e.g. IP subnet prefix). As a result, routers may not be able to aggregate addresses in their forwarding data base (e.g. one entry of 192.2.1.x to represent 256 end nodes). For example, highly virtualized data centers may have hundreds of thousands to millions of hosts and VMs because of business demands and highly advanced server virtualization technologies. To hide the massive number of end nodes in a network, an ingress boundary node may map the addresses of end nodes to an egress boundary node within the overlay network. As such, boundary nodes need to maintain a considerable amount of mapping data for the countless number of end nodes within a network when the end nodes are not placed based on their address prefix. However, boundary nodes have limited memory capacity and processing capability that may prevent boundary nodes from maintaining all the mapping information. Installing additional boundary nodes may not improve the situation because each boundary node may need to maintain all the mapping information. Therefore, many of today's networks implement processes to compensate for the mapping deficiencies found in boundary nodes.

One method to compensate for the insufficient mapping ability of boundary nodes is to flood received data packets when the destination is unknown. For instance, an ingress boundary node can receive a data packet from a source end node and not recognize which egress boundary node can reach the target end node. The ingress boundary node may encapsulate the data packet with a multicast destination address and flood the encapsulated data packet to other boundary nodes that may have attached end nodes within the virtual network instance. However, constant flooding of data packets significantly impacts network performance and capacity. Flood frames may be consistently transmitted when the target end node is out of service or when the end nodes (e.g. VMs) continually migrate within the overlay network.

Alternatively, a boundary node may send broadcast messages, such as Interior Gateway Protocol (IGP) advertisements, that announce to all other boundary nodes within the virtual network instance the specific end nodes attached to the boundary node. An example of an IGP advertisement may be a link-state routing protocol as described in the Internet Engineering Task Force (IETF) draft-ietf-trill-esadi-01, entitled "Transparent Interconnection of Lots of Links (TRILL): The End System Address Distribution Information (ESADI), published Oct. 2, 2012, which is incorporated herein as if reproduced by its entirety. All of the boundary nodes that receive the broadcast message subsequently process and cache the mapping entries for the end nodes. The constant processing of the broadcast messages coupled with processing other data traffic traveling within the overlay network may cause boundary nodes to become a bottleneck for a network. Hence, other methods are needed to efficiently manage data traffic and the address resolution amongst the end nodes and boundary nodes of a network.

SUMMARY

In one embodiment, the disclosure includes a network node comprising a processor configured to maintain a plurality of mapping entries for one or more virtual network instances, receive a data packet within a first virtual network instance, wherein the data packet comprises an inner destination address, match the inner destination address with one of the mapping entries, obtain an outer destination address that corresponds to the matched mapping entry, encapsulate the data packet with the outer destination address, and forward the encapsulated data packet based on the outer destination address, wherein the mapping entries maps out all of the addresses for a plurality of end nodes that participate in the first virtual network instance.

In yet another embodiment, the disclosure includes a network node comprising a processor configured to maintain a plurality of mapping entries for a set of virtual network instances, receive a connection status message associated with a first virtual network instance, determine whether the first virtual network instance is found within the set of virtual network instances, and update the mapping entries when the first virtual network instance is found within the set of virtual network instances, wherein the connection status message indicates the status of connections within the first virtual network instances, and wherein the mapping entries maps out all of the addresses for a plurality of end nodes that participate in the first virtual network instance.

In yet another embodiment, the disclosure includes a method for maintaining a plurality of mapping entries for one or more virtual network instances within a node, wherein the method comprises sending a first message that requests the node be removed as a first designated directory node for a first virtual network instance, determining whether a first reply message was received from a second designated directory node for the first virtual network instance, deleting the mapping entries for the first virtual network instances when the reply message is received, and sending an announcement message that comprises the virtual network instances when the node is selected as the designated directory node, wherein the reply message indicates that a second designated directory node participating in the first virtual network instance will maintain the mapping entries for the first virtual network instance, and wherein the mapping entries for the first virtual network instance provides a plurality of boundary node addresses associated with a plurality of end node addresses that participate in the first virtual network instance.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a table describing the elements of an embodiment of a virtual network instance priority table.

FIG. 10 is a table describing the elements of an embodiment of a designated directory node priority table.

DETAILED DESCRIPTION

Figure 1:
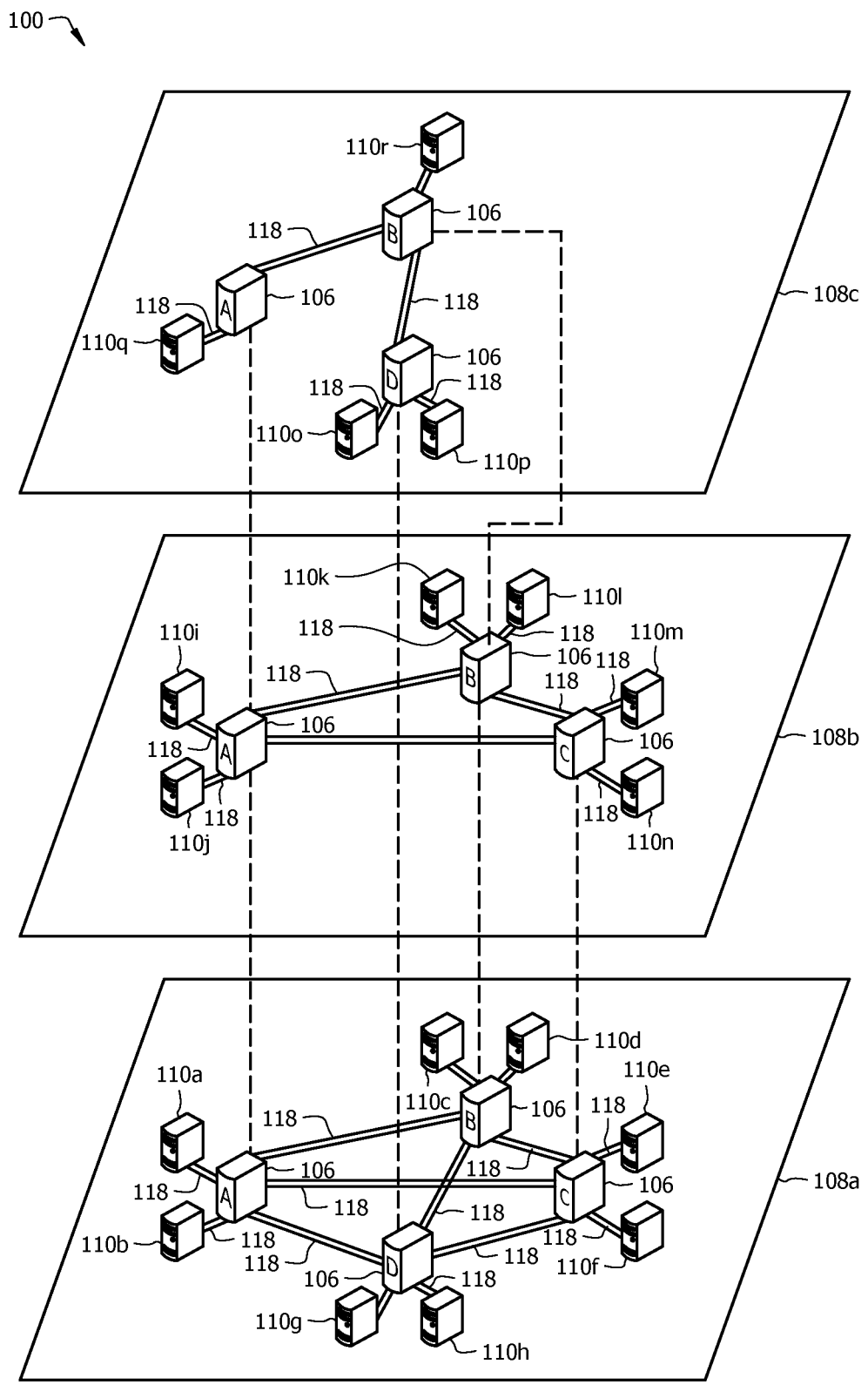
FIG. 1 is a schematic diagram of an embodiment of a network that comprises a plurality of virtual network instances.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

In today's network, a boundary node, such as gateway routers, may act as a communication gateway between end nodes and other boundary nodes within an overlay network. To promote communication, the boundary node may map the addresses of the end nodes to other boundary nodes. For example, an ingress boundary node may receive a data packet from a source end node in an overlay network and map the destination address located in the data packet to an egress boundary node of the underlay network. The ingress boundary node may encapsulate the data packet with an outer header that includes the address of the egress boundary node and transmits the encapsulated data packet within an underlay network to reach the egress boundary node. When the encapsulated data packet arrives at the egress boundary node, the egress boundary node may de-capsulate the outer header of the data packet and forward the de-capsulated data packet toward the target end node based on the destination address.

Disclosed herein are a method, an apparatus, and a system that manages the forwarding and/or address resolution in an overlay network. The overlay network may be partitioned into a plurality of virtual network instances. For each virtual network instance, one or more designated overlay edge nodes or designated directory nodes may be selected to map end node addresses to the addresses of boundary nodes that participate in the specific virtual network instance. The remainder of the disclosure will reference designated overlay edge nodes and designated directory nodes as designated directory nodes for conciseness. Selecting designated directory nodes may be based on employing a threshold value, determining the frequency of transmitting data packets for a virtual network instance, and/or a network administrator assigning designated directory nodes. Designated directory nodes may obtain the mapping information from a directory node and/or listen to IGP advertisement (e.g. link state advertisement) of boundary nodes announcing the connectivity status of end nodes attached to the boundary node. Additionally, boundary nodes that have not been selected as designated boundary nodes may send mapping requests to the designated directory nodes to obtain mapping information for end nodes (e.g. hosts) in a specific virtual network instance. A designated directory node may also relinquish and re-allocate the responsibility of being a designated directory node for a specific virtual network instance to other nodes when its resource in taking care of all the virtual network instances exceeds a certain limit.

FIG. 1 is a schematic diagram of an embodiment of a network 100 that comprises a plurality of virtual network instances. Specifically, FIG. 1 illustrates the interrelationship between virtual network instances 108a-c. In one embodiment, the network 100 may be a network that uses IP addresses that may not be aggregated based on ports/links, flat addresses or addresses that may not be subdivided, such as Media Access Control (MAC) addresses as defined in the Institute of Electrical and Electronic Engineers (IEEE) 802.1Q standard, which is incorporated herein by reference. In another embodiment, the network 100 may be a network that has fragmented addresses. For example, network 100 may have fragmented addresses when one IP subnet spans across multiple gateway node ports and each boundary node port may have one or more enabled IP subnets. Network 100 may be a network comprising one or more virtual network instances (e.g. IP subnets), local area networks (LANs), metropolitan area networks (MANs), and/or wide area networks (WANs). In one embodiment, network 100 may be a data center network.

Network 100 may comprise an underlay network that may be any physical network capable of supporting one or more virtual network instances. The underlay network may operate at Open Systems Interconnection (OSI) layer 1, layer 2, or layer 3. The underlay network may comprise boundary nodes 106, internal core nodes, such as routers and switches, and a plurality of physical links. Boundary nodes 106 and internal core nodes may be coupled to each other via the physical links in the underlay network. Physical links may include, but are not limited to fiber optic links, electrical links, and wireless links. Physical links may comprise a single link, a series of parallel links, a plurality of interconnected core nodes in the underlay network, or various combinations thereof. Boundary nodes 106 may include gateway nodes, access switches, Top of Rack (ToR) switches, virtual switches within servers, and any other devices that may encapsulate or decapsulate packets from or to end nodes with outer address headers. The underlay network may be a network that includes, but is not limited to an Internet Protocol (IP) network, a virtual local area network (VLAN), a TRILL network, a Provider Back Bone (PBB) network, a Shortest Path Bridging (SPB) network, Generic Routing Encapsulation (GRE) network, Locator/Identifier Separation Protocol (LISP) network, and Optical Transport Virtualization (OTV) (using User Datagram Protocol (UDP)). The underlay network may be bounded by the boundary nodes which encapsulate another header (e.g. IP header, MAC header, TRILL header) for data frames received from outside the underlay network, and decapsulate the header for data frames received from within the underlay network and forward the data frames to their destination outside the underlay network.

The overlay network may comprise a plurality of virtual network instances 108*a*-*c*, such as IP subnets that partition network 100. Virtual network instances 108*a*-*c* may be collectively referred to as virtual network instances 108 throughout this disclosure. The virtual network instances 108 may be represented by many different types of virtual network identifiers in the underlay network, such as VLAN identifiers (VLAN-IDs), Service Instance Identifiers (ISIDs), subnet addresses, GRE key fields, multiprotocol label switching (MPLS) headers, and any other identifiers known to persons of ordinary skill in the art. In one embodiment, each virtual network instance 108 may be represented by one virtual network identifier. Other embodiments may constrain forwarding of data traffic by using more than one virtual network identifier to represent a virtual network instance.

Each virtual network instance 108 may comprise one or more boundary nodes 106, one or more end nodes 110*a*-*r*, and a plurality of logical connections 118. Within each virtual network instance 108, the logical connections 118 may interconnect boundary nodes 106, end nodes 110*a*-*r*, and other nodes that are not shown in FIG. 1. The logical connections 118 may correspond to one or more physical links and may be used to transport data between boundary nodes 106, end nodes 110*a*-*r*, and other nodes within the virtual network instance 108. The types of logical connections 118 may include, but are not limited to MPLS tunnels, label switch path (LSP) tunnels, GRE tunnels, and IP tunnels. Different logical connections 118 may be used depending on the type of underlay network and overlay network. End nodes 110*a*-*r* may be collectively referred throughout the disclosure as end nodes 110.

The network layout and topology for each virtual network instance 108 may differ amongst each other. For example, in FIG. 1, the boundary nodes 106 within virtual network instance 108*a* may be connected in a mesh topology, while boundary nodes A and D 106 are connected via boundary node B 106 in virtual network instance 108*c*. Moreover, virtual network instance 108*b* may connect boundary nodes A, B, and C 106 in a ring topology. Persons of ordinary skill in the art are aware that a variety of network topologies and layouts may be implemented within the virtual network instances 108.

In one embodiment, end nodes 110 may be located outside the underlay network (e.g. outside the data center network) and within the overlay network. The underlay network may be a different autonomous system or a different network than the overlay network. In one embodiment, the underlay network and overlay network may be a client-server relationship where the client network represents the overlay network, and the server network represents the underlay network. End nodes 110 may be client-centric devices that include servers, storage devices, hosts, virtualized servers, VMs and other devices that may originate data into or receive data from the overlay network. The end nodes 110 may be configured to join and participate within virtual network instances. For example, FIG. 1 illustrates that end nodes 110*a*-*h* may be located within virtual network instance 108*a*; end nodes 110*i*-*n* may be located within virtual network instance 108*b*; and end nodes 110*o*-*r* may be located within virtual network instance 108*c*.

Each boundary node 106 may be directly attached to one or more end nodes 110 within a given virtual network instance via logical connections 118. FIG. 1 illustrates that boundary node A 106 may be directly attached to end nodes 110*a, b, i, j*, and *q*; boundary node B 106 may be directly attached to end nodes 110*c, d, k, l*, and *r*; boundary node C 106 may be directly attached to end nodes 110*e, f, m*, and *n*; and boundary node D 106 may be directly attached to end nodes 110*g, h, o*, and *p*. A boundary node 106 may be configured to map the addresses of directly attached end nodes 110 to other boundary nodes 106 for some of the virtual network instances 108 that the attached end nodes 110 participate in. For example, boundary node A 106 may map the addresses of boundary nodes B-D 106 to the addresses of end nodes 110*a* and 110*b* in virtual network instance 108*a* or vice versa.

The number of mapping entries for boundary nodes 106 may be based on the virtual network instances that the attached end nodes 110 participate in. For example, in FIG. 1, boundary node A 106 is attached to end nodes 110*a, b, i, j*, and *q*. End nodes 110*a* and 110*b* participate in virtual network instance 108*a*; end nodes 110*i* and 110*j* participate in virtual network instance 108*b*; and end node 110*q* participates in virtual network instance 108*c*. Hence, boundary node A 106 may be configured to map the addresses of other boundary nodes 106 (e.g. boundary node B and C 106) within virtual network instance 108*a*-*c* to the target destination addresses of end nodes 110*a, b, i, j*, and *q*. If memory space allows, boundary nodes 106 may be configured to map the addresses for all the virtual nodes located in all of the virtual network instances to the target destination addresses of all end nodes 110. Another embodiment of the boundary node 106 may map the addresses of other boundary nodes 106 within a specified number of virtual network instances 108 (e.g. less than all of the virtual network instances within the overlay network) to the target destination addresses of all the end nodes 110.

A designated directory node may be any node configured to resolve an unknown destination address (e.g. address of end node 110) received by a boundary node 106 within a specific virtual network instance. In other words, the designated directory node may map the target destination addresses of all end nodes 110 that participate in the specific virtual network instance to the addresses of all the boundary nodes 106 located within a specific virtual network instance. Using FIG. 1 as an example, boundary node A 106 may be selected as a designated directory node for virtual network instance 108b. As a designated directory node, boundary node A 106 may map the target destination addresses of end nodes 110i-n to the addresses of boundary nodes A-C 106, which are located in virtual network instance 108b. If boundary node B 106 receives a data packet in virtual network instance 108b that has an unknown destination address, boundary node B 106 may obtain the mapping information for the destination address from the designated directory node (e.g. boundary node A 106). In another embodiment, boundary node B 106 may forward the data packet to the designated directory node (e.g. boundary node A 106), and the designated directory node may forward the data packet to the proper node. Designated directory nodes may include, but are not limited to boundary nodes 106, directory nodes, access switches, and ToR switches.

One or more of the boundary nodes 106 may be selected as designated directory nodes within a virtual network instance 108. Using FIG. 1 as an example, boundary nodes A-C 106 may be selected as designated directory nodes and may provide the mapping for all end nodes 110 that participate in virtual network instance 108a. Boundary nodes 106 may also be a designated directory node for one or more virtual network instances that the boundary node 106 participates in. As shown in FIG. 1, boundary node A 106 may participate in virtual network instances 108a-c. Boundary node A 106 may be selected as a designated directory node for two of the virtual network instances 108 or for all three virtual network instances 108. As a designated directory node for all three virtual network instances, boundary node A 106 may provide the mapping for all the end nodes 110 that participate in virtual network instance 108a-c. In another embodiment, boundary node A 106 may be unable to provide mapping for all end nodes 110 that participate in virtual network instance 108c because of the lack of resources, and thus may be a designated directory node for virtual network instance 108a and 108b, and not for virtual network instance 108c. Other embodiments of boundary node A 106 may exist when boundary node A 106 is located within "X" number of virtual network instances, but may be a designated directory node for "Y" number of virtual network instances, where "Y" is less than "X." For example, boundary node A 106 may be located in 4000 VLANs, but may be a designated directory node for 1000 VLANs out of the 4000 VLANs.

In one embodiment, a designated directory node may advertise an announcement message, while other nodes not selected as designated directory nodes may not advertise an announcement message. A designated directory node may transmit the announcement message within each virtual network instance the node has been selected as a designated directory node. The announcement message may provide the virtual network instances that a node has been selected as a designated directory node and other reachability information. Using FIG. 1 as an example, boundary node A 106 may advertise that boundary node A 106 may be selected as a designated directory node for virtual network instance 108a and virtual network instance 108b, while boundary node B 106 may advertise that boundary node B 106 may be selected as a designated directory node for virtual network instance 108b. The announcement message advertised by each designated directory node may be processed by other boundary nodes 106 within the overlay network. The announcement message will be discussed in more detail in FIG. 6.

Figure 2A:
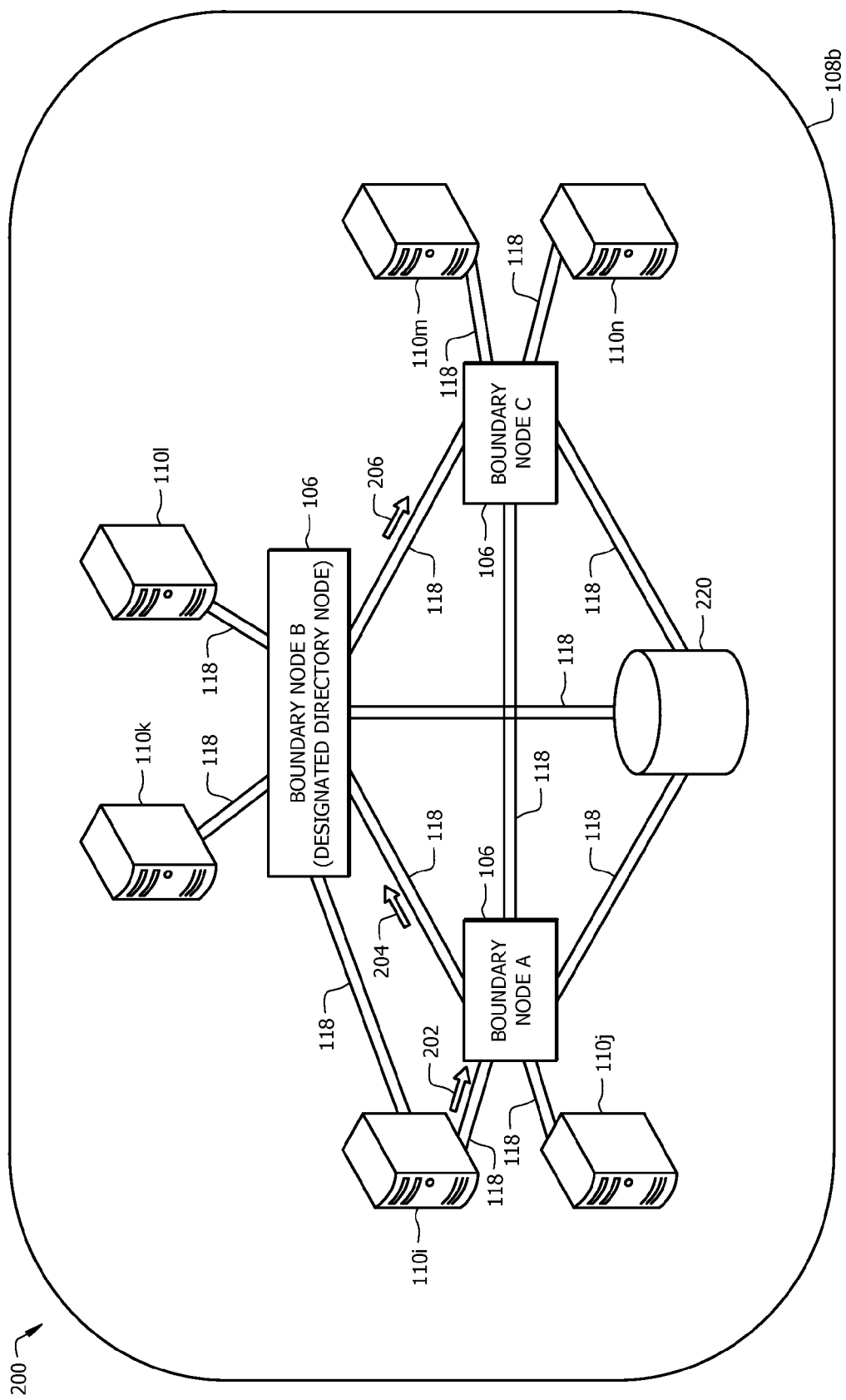
FIG. 2A is a schematic diagram of another embodiment of a network.

FIG. 2A is a schematic diagram of another embodiment of a network 200. More specifically, FIG. 2A illustrates virtual network instance 108b. Recall that virtual network instance 108b may comprise boundary nodes A-C 106, end nodes 110i-n, and logical connections 118. FIG. 2A illustrates that boundary node B 106 may be selected as a designated directory node for virtual network instance 108b, while boundary nodes A and C 106 have not been selected as designated directory nodes. As discussed above, other embodiments may select more than one designated directory node for virtual network instance 108b.

As shown in FIG. 2A, boundary node A 106 may receive a data packet 202 from end node 110i. The data packet 202 may comprise an inner destination address that boundary node A 106 may not have the mapping information for in virtual network instance 108b. In one embodiment, the inner destination address may be a MAC address that represents the target destination address of end node 110i. When boundary node A 106 receives data packet 202, boundary node A 106 may encapsulate data packet 202 with an outer header (e.g. a TRILL header) that includes an outer destination address that references a designated directory node in virtual network instance 108b. In this instance, the outer destination address in the outer header may reference boundary node B 106. After boundary node A 106 encapsulates data packet 202 with the outer header, boundary node A 106 may transmit the encapsulated data packet 204 to boundary node B 106. In another embodiment, where multiple designated directory nodes are located in virtual network instance 108b, boundary node A 106 may perform load balancing amongst the multiple designated directory nodes to determine which designated directory node receives the encapsulated data packet 204.

When boundary node B 106 receives the encapsulated data packet 204 as the designated directory node, boundary node B 106 may subsequently decapsulate the outer header and map the inner destination address to an address that references the proper boundary node 106 within virtual network instance 108b. The boundary node B 106, as the designated directory node, may determine whether the inner destination address within the inner header references an end node 110 directly attached to boundary node B 106, such as end node 110k and 110l. If the inner destination address does not reference a directly attached end node 110, then boundary node B 106 may encapsulate and transmit an encapsulated data packet 206 to the proper boundary node 106. The encapsulated data packet 206 may comprise an outer destination address within an outer header (e.g. TRILL header) that references the proper boundary node 106. In FIG. 2A, The newly encapsulated data packet 206 may be subsequently transmitted to boundary node C 106. As the proper boundary node 106, boundary node C 106 may receive the newly encapsulated data packet 206, decapsulate the encapsulated data packet, and forward the decapsulated data packet to the proper end node 110.

FIG. 2A also illustrates that a directory node 220 may be coupled to boundary nodes A-C 106. Directory node 220 may be a central orchestration system or any other device that provides management functions, end node 110 location information, and/or network topology information. In one embodiment, directory node 220 may provide all the mapping information for all of the end nodes that participate in virtual network instance 108b. Directory node 220 may be located within the overlay network. A designated directory node (e.g. boundary node B 106) may obtain some or all of the mapping information for virtual network instance 108b from the directory node 220. In another embodiment where directory node 220 does not exist, the designated directory nodes may obtain the mapping information using an IGP advertisement such as the IETF draft-ietf-trill-esadi-01, entitled "Transparent Interconnection of Lots of Links (TRILL): The End System Address Distribution Information (ESADI). IGP advertisements may provide reachability information that may include, end node addresses, end node-to-end node routes, MAC addresses, and virtual network instance information. Boundary nodes 106 may advertise the reachability information, but only nodes selected as designated directory nodes may process the IGP advertisement. Obtaining mapping information without a directory server will be discussed in more detail in FIG. 4.

More than one boundary node 106 may be directly connected to an end node 110 via a logical connection 118. In FIG. 2A, boundary node A and B 106 may be directly connected to end node 110i. When one or more end nodes 110 are connected to multiple boundary nodes 106 within virtual network instance 108b, each boundary node 106 may advertise a "connection status" message that indicates whether the connection to each directly attached end node 110 is operational. The advertisement of the "connection status" message may indicate whether the connection is currently operational for each directly attached end node 110. For example, the logical connection 118 between boundary node A 106 and end node 110i may have experienced a fault that prevents communication between the two nodes. Boundary node A 106 may advertise a "down" connection status for end node 110i. On the other hand, the logical connection 118 between boundary node B 106 and end node 110i may be operational. Boundary node B 106 may advertise an "up" connection status for end node 110i. Designated directory nodes within the virtual network instance 108b may receive the "connection status" message and may use the information to update mapping entries. All other nodes not selected as a designated directory node within virtual network instance 108b may ignore or discard the "connection status" message. Each boundary node 106 may advertise the "connection status" message when the connectivity to the end nodes 110 changes for a specific virtual network instance 108 (e.g. moves from "up" status to "down" status). The content of the "connection status" message will be discussed in more detail in FIG. 5.

Figure 2B:
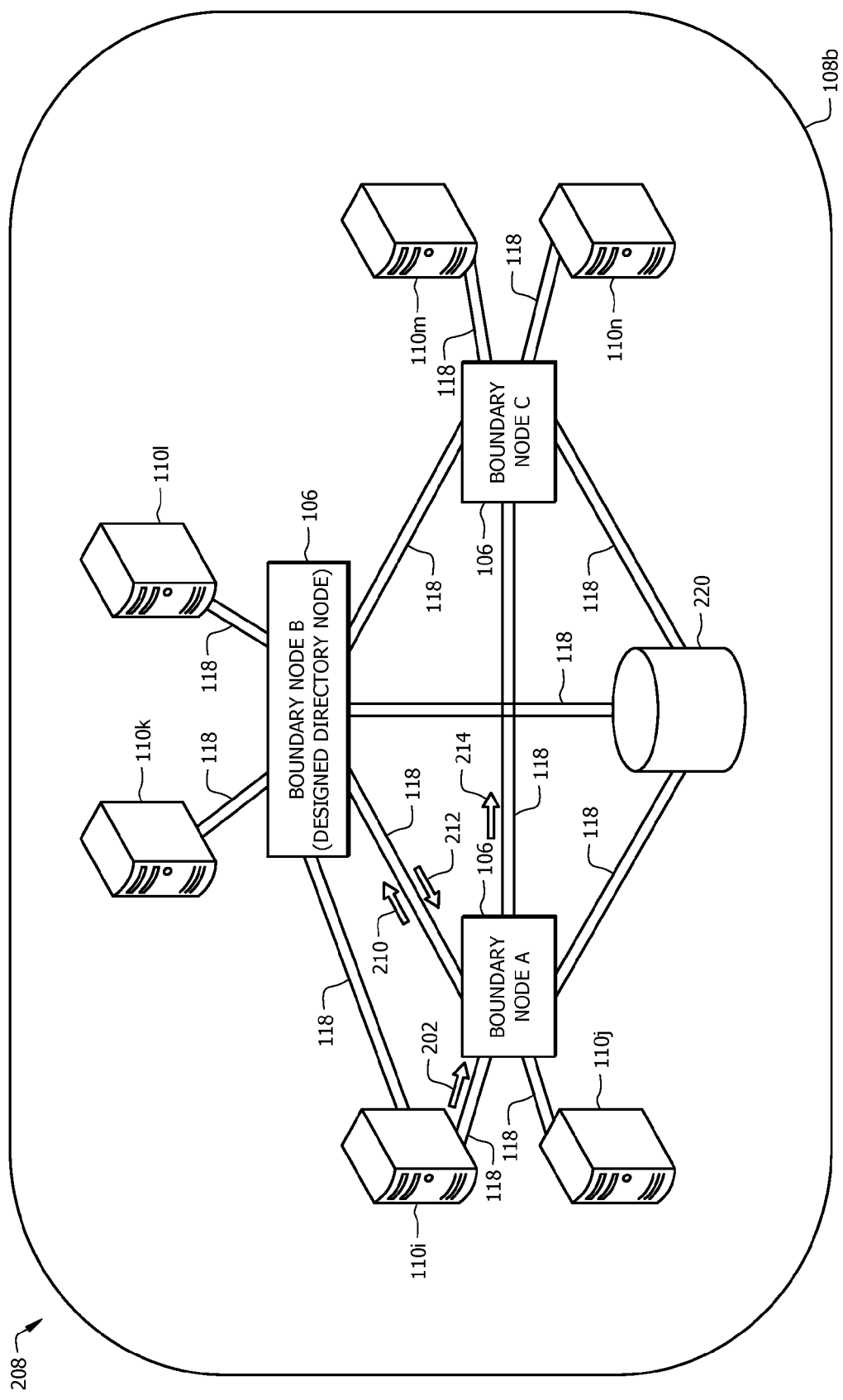
FIG. 2B is a schematic diagram of another embodiment of a network.

FIG. 2B is a schematic diagram of another embodiment of a network 208. As discussed in FIG. 2A, when boundary node A 106 receives a data packet 202 and the inner destination address is unknown, the boundary node A 106 may encapsulate an outer header and forward the data packet to a boundary node. In FIG. 2B, instead of sending an encapsulated packet to the designated directory node (e.g. boundary node B 106), boundary node A 106 may send a mapping request 210 to boundary node B 106. Sending a mapping request 210 may prevent boundary node A 106 from flooding data packet 202 to other nodes within virtual network instance 108b. The boundary node B 106 may receive the mapping request 210 and transmit a reply message 212, which may include the proper mapping address, back to boundary node A 106. Boundary node A 106 may receive the reply message 212 and update its own mapping information. Afterwards boundary node A 106 may encapsulate frame 202 with an outer destination address that identifies the proper boundary node 106, and send the encapsulated frame 214 to the proper boundary node 106 (e.g. boundary node C 106). Boundary node A 106 may cache other incoming data packets not shown in FIG. 2B until boundary node A 106 receives the reply message 212 from boundary node B 106.

The designated directory node may be configured to provide a forwarding capability and/or a mapping capability. In network 208, each designated directory node may send a capability announcement message to the boundary nodes 106 so that the boundary nodes 106 may know whether the designated directory node may be able to provide mapping information. Recall that in FIG. 2A the designated directory node may receive a data packet from a boundary node 106 and forward the data packet received from the boundary node 106 to the target end node 110. In this embodiment, the designated directory node may be designated as providing a forwarding capability. When the designated directory node is configured to support a mapping ability, the designated directory node may provide the mapping information to a boundary node 106. The capability announcement message will be discussed in more detail in FIG. 7.

Figure 3A:
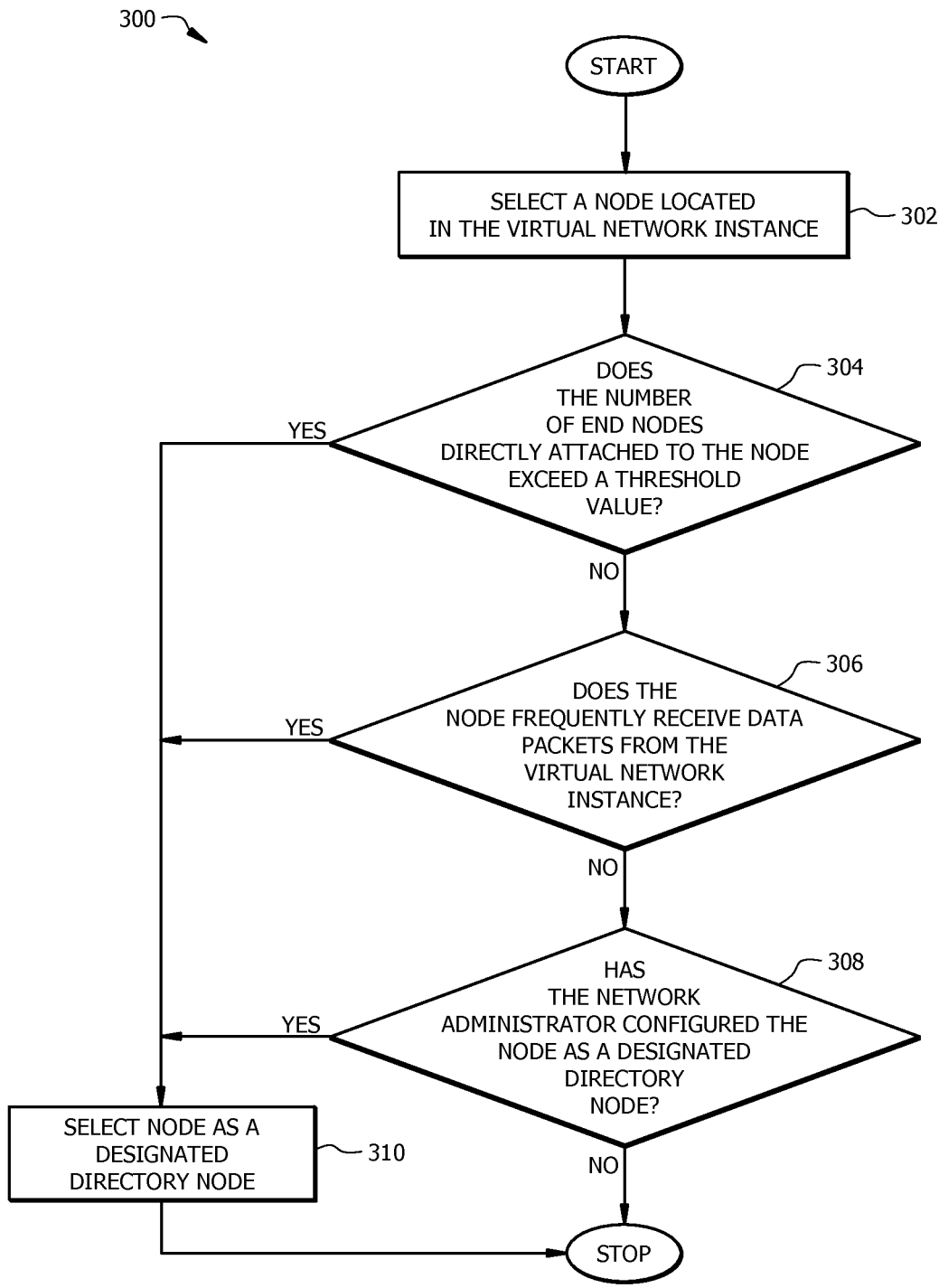
FIG. 3A is a flowchart of an embodiment of a method for selecting a designated directory node within a virtual network instance.

FIG. 3A is a flowchart of an embodiment of a method 300 for selecting a designated directory node within a virtual network instance. Method 300 may start at block 302 and select a node located within the virtual network instance. The node may be a boundary node, a directory node, or any other type of node that may be configured to manage the mapping information for the end nodes and boundary nodes within the virtual network instance. Once method 300 selects a node, method 300 continues to block 304.

At block 304, method 300 determines whether the number of end nodes directly attached to the node within the virtual network instance exceeds a threshold value. The threshold value may be a number and/or based on a percentage set by an operator or network administrator. For example, when a virtual network instance (e.g. VLAN) has 100 end nodes distributed among 50 boundary nodes, the threshold value may be set to 5% or five end nodes. If the number of end nodes directly attached to the node exceeds the threshold value, method 300 may move to block 310. Conversely, if the number of end nodes directly attached to the node does not exceed the threshold value, method 300 may move to block 306.

At block 306, method 300 may determine the frequency the node receives data packets from the virtual network instance. For example, the node may be a boundary node that transmits and receives data packets from a variety of virtual network instances and/or the underlay network. The node may receive data packets from the virtual network instance more than 90% of the time. Method 300 may then determine that the node frequently receives data packets from the virtual network instance. When the node frequently receives data packets from the virtual network instance, method 300 may proceed to block 310. However, when the node does not frequently receive data packets from the virtual network instance, method 300 may proceed to block 308.

At block 308, method 300 may determine whether a network administrator and/or operator may have configured the node as a designated directory node. For example, a network administrator may statically configure certain boundary nodes as designated directory nodes when initially configuring the virtual network instance. Even if the network administrator subsequently moves some of the end nodes directly attached to the boundary node to another location within the virtual network instance, the boundary node may still remain a designated directory node for the virtual network instance. If method 300 determines that a network administrator and/or operator has configured the node as a designated directory node, then method 300 continues to block 310; otherwise, method 300 stops. At block 310, method 300 may select the node as a designated directory node for the virtual network instance. As discussed above, the designated directory node may be configured to maintain all the mapping information for the end nodes and boundary nodes within the virtual network instance. An announcement message may be advertised by the node that provides a list of virtual network instances that the node may be a designated directory node to boundary nodes. The announcement message will be discussed in more detail in FIG. 6.

Figure 3B:
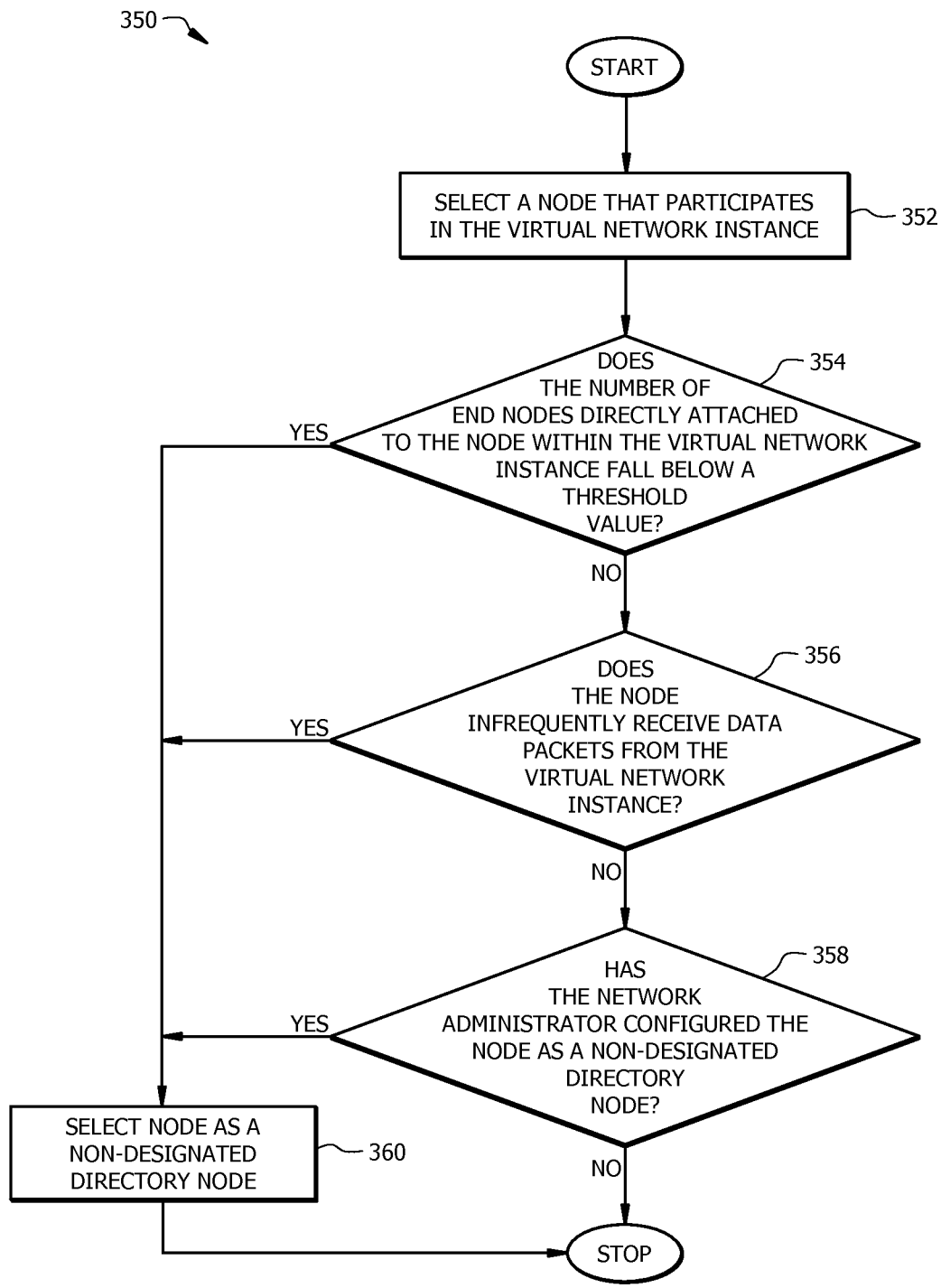
FIG. 3B is a flowchart of an embodiment of a method for selecting a non-designated directory node within a virtual network instance.

FIG. 3B is a flowchart of an embodiment of a method 350 for selecting a non-designated directory node within a virtual network instance. In contrast to method 300, method 350 may determine whether a node may be selected as a non-designated directory node or a node that may not be selected as a designated directory node. Block 352 of method 350 may be substantially similar to blocks 302 of method 300, respectively. At block 354, method 350 may use the threshold value as a "not designated threshold" to select non-designated directory nodes instead of selecting designated directory nodes. If the number of end nodes directly attached to the node falls below the threshold value, method 350 may move to block 360 and select the node as a non-designated directory node. However, if the number of end nodes directly attached to the node does not fall below the threshold value, method 350 may move to block 356.

At block 356, if method 350 determines that the node infrequently receives data packets from the virtual network instance, then method 350 may move to block 360 to select the node as a non-designated directory node. For example, the node may receive data packets from the virtual network instance less than 10% of the time. When the node infrequently receives data packets from the virtual network instance (e.g. less than 10% of the time), method 350 may proceed to block 358. At block 358, method 350 may determine whether a network administrator has selected the node as a non-designated directory node. When the node has been selected by the network administrator as a non-designated directory node, method 350 may proceed to block 360 and select the node as a non-designated directory node. Otherwise, if a network administrator has not selected the node as a non-designated directory node, method 350 may stop.

Figure 4:
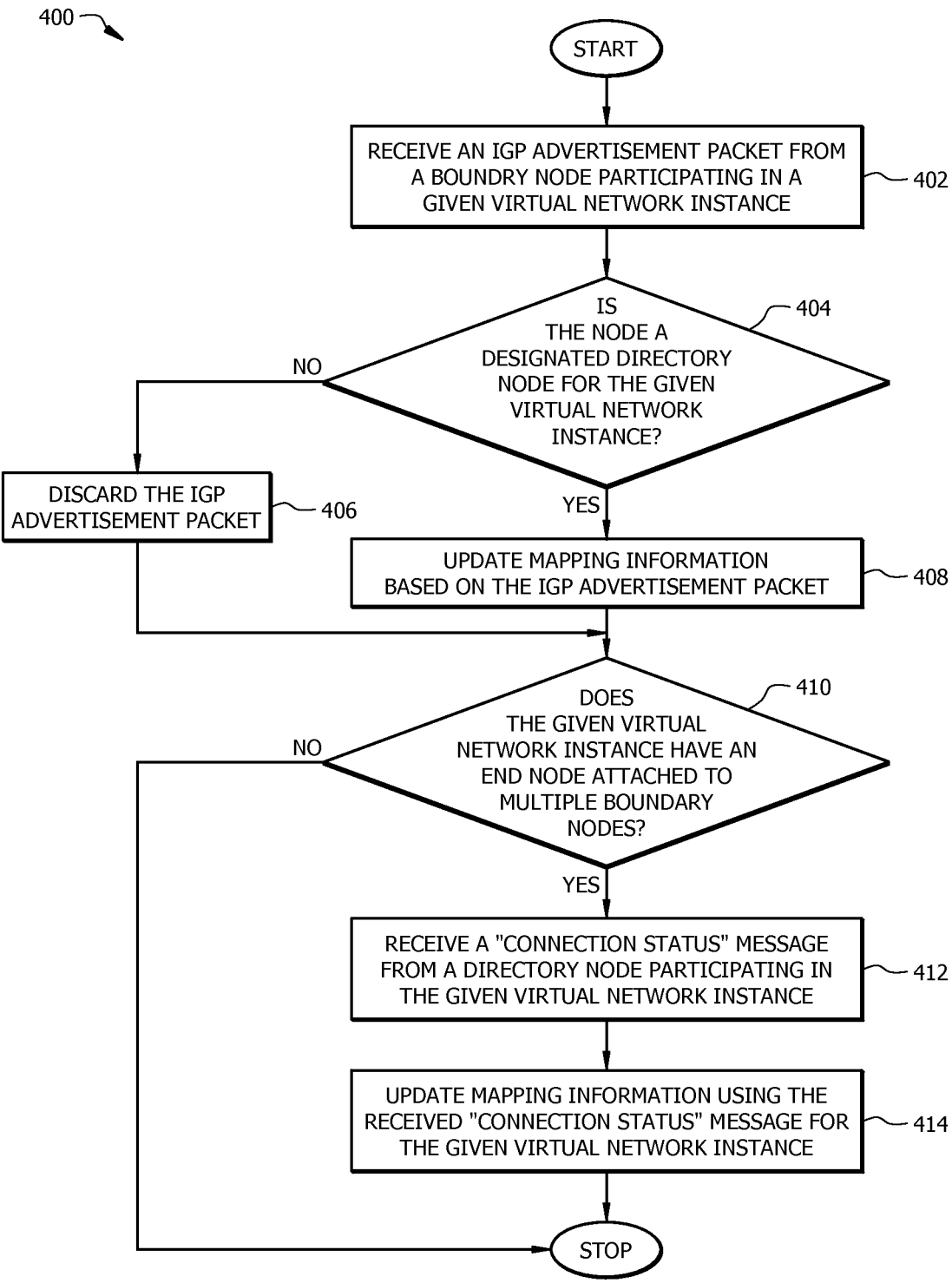
FIG. 4 is a flowchart of an embodiment of a method for obtaining mapping information without a directory node.

FIG. 4 is a flowchart of an embodiment of a method 400 for obtaining mapping information without a directory node. Method 400 pertains to networks that may not comprise a directory node, and may use IGP routing protocol to obtain mapping information from boundary nodes. To update mapping information in designated directory nodes, boundary nodes may advertise reachability information for directly attached end nodes via an IGP advertisement. The IGP advertisement may be a link state advertisement, such as an Intermediate System to Intermediate System (IS-IS) link state advertisement that is broadcasted to other nodes that participate in a given virtual network instance. Designated directory nodes for the given virtual network instance may process the message to update mapping information. Nodes not selected as a designated directory node and participate in the virtual network instance may ignore and/or discard the IGP advertisement message. Designated directory nodes may also process "connection status" messages that are transmitted within the given virtual network instance, while other nodes not selected as designated directory nodes may discard the IGP advertisement.

Method 400 may start at block 402 and receive an IGP advertisement packet from a boundary node participating in a given virtual network instance. Method 400 may then proceed to block 404 to determine whether the node has been selected as a designated directory node for the given virtual network instance. At block 404, method 400 may determine whether the node has been selected as a designated boundary node using methods described in FIGS. 3A and 3B. If the node has not been selected as a designated directory node, method 400 may proceed to block 406 and discard the IGP advertisement packet. However, if the node has been selected as a designated directory node, then the node may proceed to block 408. At block 408, method 400 may update the mapping information. Afterwards, method 400 may proceed to block 410.

At block 410, method 400 may determine whether an end node is attached to multiple boundary nodes that participate in the given virtual network instance. If method 400 determines that an end node is attached to multiple boundary nodes that participate in the given virtual network instance, then method proceeds to block 412. However, if method 400 determines an end node is not attached to multiple end nodes that participate in the given virtual network instance, then method 400 stops. Returning to block 412, blocks 412 and 414 are substantially similar to blocks 306 and 308 of method 300. After method 400 completes block 414, method 400 ends.

Figure 5:
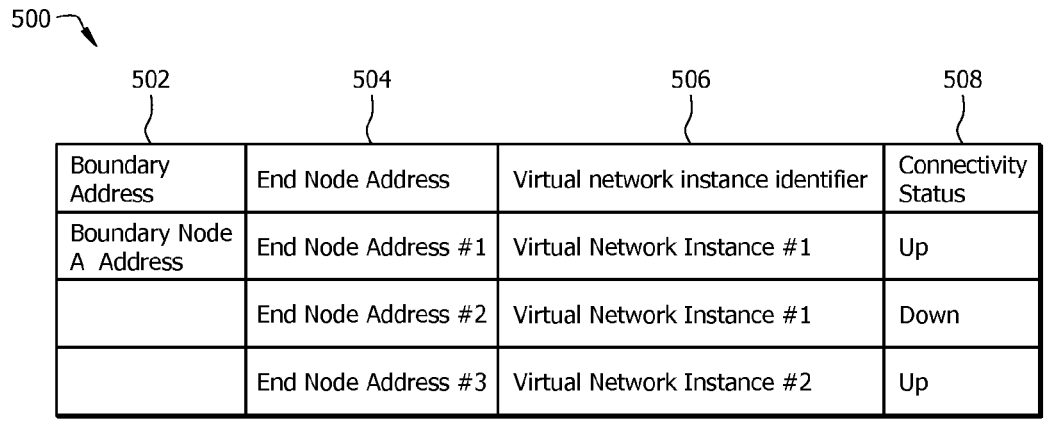
FIG. 5 is a table describing the elements of an embodiment of the "connection status" message 500.

FIG. 5 is a table describing the elements of an embodiment of the "connection status" message 500. Recall that boundary nodes may transmit a "connection status" message that announces connectivity status of the end nodes directly attached to the boundary nodes. The boundary node may transmit a "connection status" message when changes occur in the connectivity status between the boundary node and one or more end nodes directly attached to the boundary node. The "connection status" message may provide the virtual network instances that the directly attached end nodes participate in and the status of the connection. Designated directory nodes that receive the "connection status" message and participate in virtual network instance may process the message to update mapping information. Nodes not selected as a designated directory node and participate in the virtual network instance may ignore and/or discard the "connection status" message. The "connection status" message may be broadcasted as a link state advertisement (e.g. IS-IS) with extended type-length-value (TLV).

The "connection status" message 500 may comprise a boundary address field 502, an end node address field 504, a virtual network instance identifier field 506, and a connectivity status field 508. The boundary node address field 502 may indicate the address of the boundary node that transmitted the "connection status" message 500. Boundary node address A may be the address of the boundary node that transmitted the "connection status" message 500. The end node address 504 may indicate the address of the end nodes that are directly attached to the boundary node that is transmitting the "connection status" message 500. In FIG. 5, boundary node address A may be directly attached to end node addresses #1-#3. In one embodiment, the boundary node address A and end node address #1-#3 may be media access control (MAC) addresses. End node addresses #1-#3 will be referenced as end nodes #1-#3 for conciseness. The virtual network instance identifier field 506 may identify the virtual network instance that the end nodes may participate in. FIG. 5 illustrates that end node #1 and end node #2 may participate in virtual network instance #1 and end node #3 may participate in virtual network instance #2. As discussed above, VLAN IDs and other identifiers (e.g. ISID) may be used to identify virtual network instances. The connectivity status field 508 may indicate whether the connection is "up" (e.g. can transmit data) or "down" (e.g. unable to transmit data) within the virtual network instance identified by the virtual network instance identifier field 506. FIG. 5 shows that the connectivity status for end node #1 in virtual network instance #1 and end node #3 in virtual network instance #2 may be "up," while the connectivity status for end node #2 in virtual network instance #1 may be "down." Using FIG. 1, as an example, boundary node A 106 may be directly connected to end nodes 110a and 110b within virtual network instance 108a and end node 110i within virtual network instance 108b. Boundary node A 106 may transmit a "connection status" message 500 within virtual network instance 108a when the connectivity status for end node 110a in virtual network instance 108a transitions from an "up" state to a "down" state.

Figure 6:
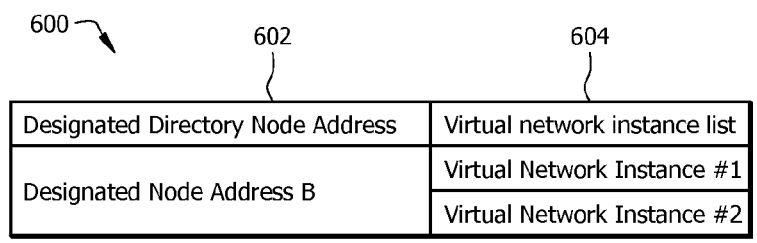
FIG. 6 is a table describing the elements of an embodiment of the announcement message sent by a designated directory node.

FIG. 6 is a table describing the elements of an embodiment of the announcement message 600 sent by a designated directory node. The announcement message 600 may comprise a designated directory node address field 602 and a virtual network instance list field 604. The designated directory node address field 602 may indicate the address of the node that transmitted the announcement message 600. In FIG. 6, the designated directory node address B may be the address of the designated directory node that transmitted announcement message 600. The virtual network instance list field 604 may indicate the virtual network instances that the node has been selected as a designated directory node. In FIG. 6, designated directory node B may be a designated directory node for virtual network instance #1 and virtual network instance #2. In one embodiment the virtual network instance list field 604 may identify the virtual network instances using an identifier substantially similar to the identifier used in virtual network identifier field 506 in FIG. 5. Using FIG. 1, as an example, FIG. 6 illustrates that boundary node B 106 may be selected as a designated directory node for virtual network instances 108a (e.g. virtual network instance #1) and 108b (e.g. virtual network instance #2). In one embodiment, the announcement message 600 may be a link-state advertisement with extended type-length-value (TLV).

Figure 7:
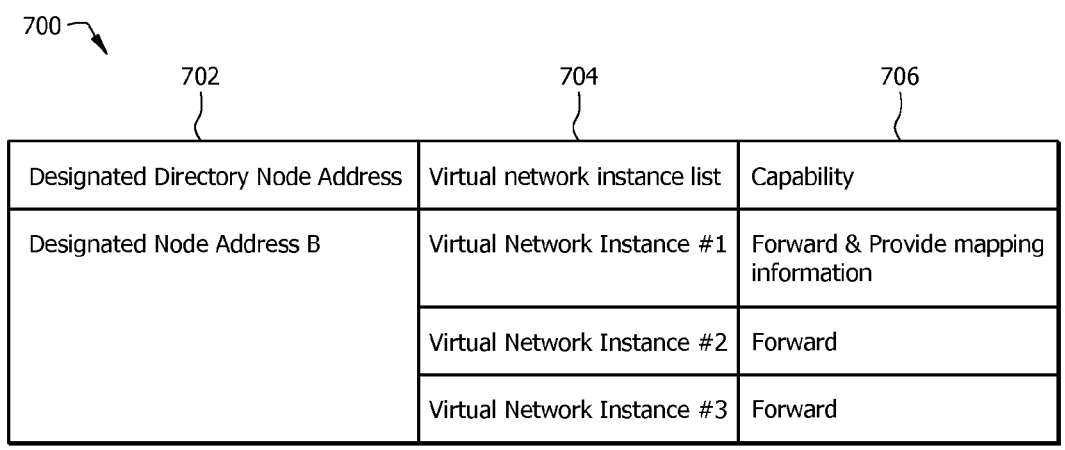
FIG. 7 is a table describing the elements of an embodiment of a capability announcement message sent by a designated directory node.

FIG. 7 is a table describing the elements of an embodiment of a capability announcement message 700 sent by a designated directory node. The capability announcement message 700 may comprise a designated directory node address 702, a virtual network instance list field 704, and a capability field 706. The designated directory node address 702 and the virtual network instance list field 704 may be substantially similar to the designated directory node address 602 and virtual network instance list field 604. In FIG. 7, the designated directory node address B may be the address of the designated directory node providing the capability announcement message 700, and virtual network instances #1-#3 may be the virtual network instances that the node has been selected as a designated directory node. The capability field 706 may indicate the types of configurations for a designated directory node. FIG. 7 illustrates that the designated directory node may be configured with a forwarding ability and a mapping ability within virtual network instance #1, while for virtual network instances #2 and #3, the designated directory node may have the forwarding capability without the mapping ability. As discussed in FIG. 2A, the designated directory node may receive a data packet from a boundary node that does not know where to forward the data packet based on the inner destination address. The designated directory node may encapsulate the data packet with the proper outer destination address and forward the data packet to the proper boundary node. The designated directory node may also be configured with a mapping ability. Recall that in FIG. 2B a designated directory node may receive a mapping request from a boundary node and reply back with the mapping information. Subsequently, the boundary node may transmit the data packet to the proper boundary node. Similar to announcement message 600, capability announcement message 700 may be a link-state advertisement with extended type-length-value (TLV).

Figure 8:
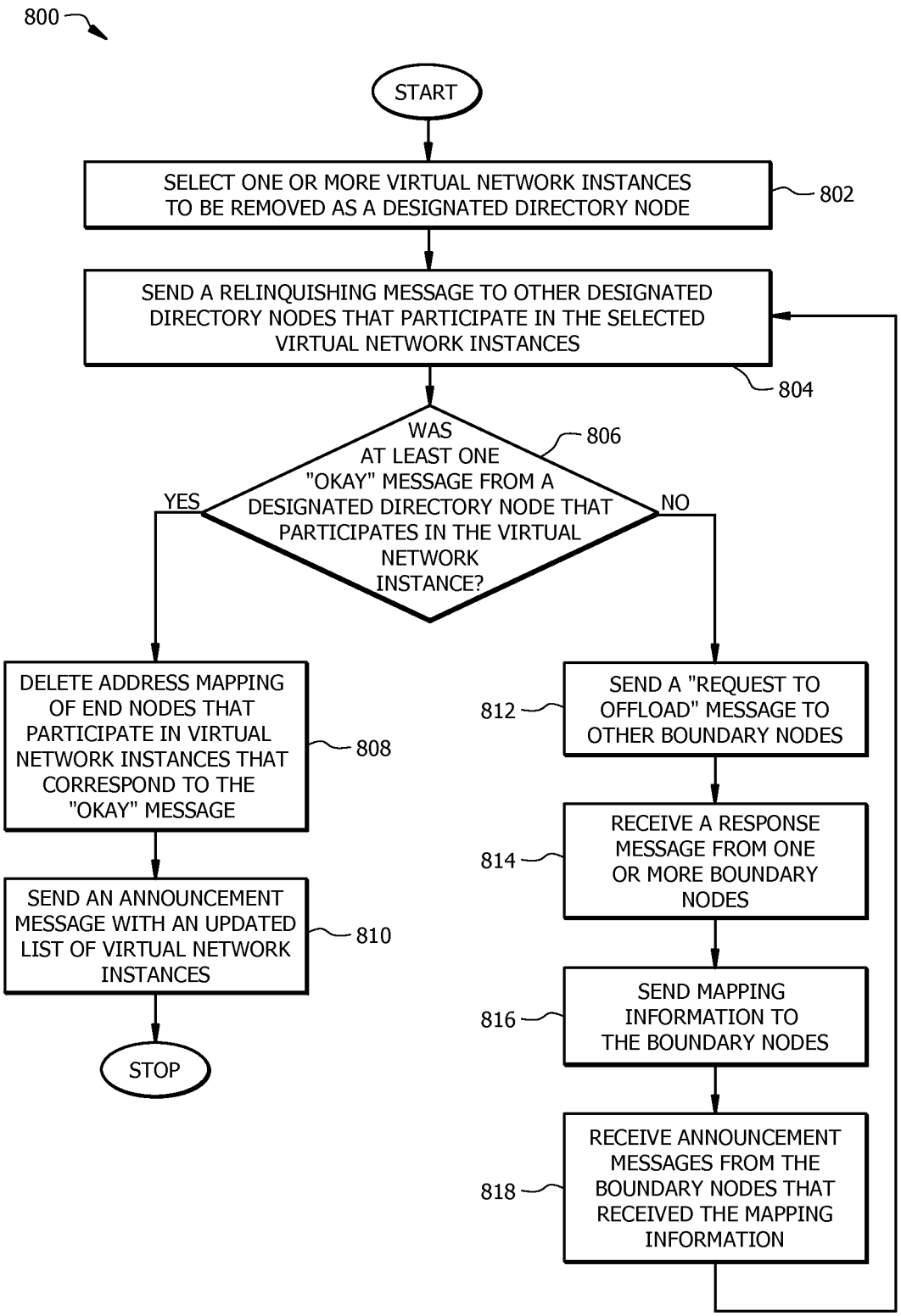
FIG. 8 is a flowchart of an embodiment of a method for a node to remove its role as a designated directory node for a virtual network instance.

FIG. 8 is a flowchart of an embodiment of a method 800 for a node to remove its role as a designated directory node for a virtual network instance. As a designated boundary node, a node may become overloaded with mapping entries and/or become a processing bottleneck. When the resources allocated to manage the mapping entries and/or mapping information exceeds a certain threshold, the designated directory node may alleviate some of its workload. To alleviate the node's workload, the node may reduce the number of virtual network instances the node acts as a designated directory node. The node may remove the role of being a designated directory node for a given virtual network instance when at least one other designated directory node has been selected within the virtual network instance. When no other designated directory node is available to take over the designated directory node role, the node may send a "request to offload" message to select other nodes to become designated directory nodes.

Method 800 starts at block 802 and selects one or more virtual network instances to be removed as a designated directory node. Each designated directory node may maintain priority values for each supported virtual network instances. When there are multiple virtual network instances whose mapping entries may be deleted, the designated directory node may start with the virtual network instance with the lower priority values. In one embodiment, the priority levels may be configured by a network administrator and/or operator. The network administrator and/or operator may select at least two designated directory nodes to maintain the mapping information for each virtual network instance. Alternatively, priority values may be calculated based on the difficulty level in reaching end nodes participating in the virtual network instance. For example, round trip delay calculations, number of links, and bandwidth may be some of the ways in determining the difficulty level to reaching end nodes. Priority values may also be determined based on the frequency the mapping entries for a given virtual network instance has been requested. If within a certain time threshold, mapping entries for a given virtual network has not been requested, then method 800 may downgrade the priority level.

After method 800 finishes selecting the virtual network instance, method 800 may move to block 804 and send a relinquishing message to all other designated directory nodes that participate in a specific virtual network instance. The relinquishing message indicates that the node wants to delete its role as a designated directory node for the specific virtual network instance. In other words, the node no longer desires to store the mapping information for end nodes and boundary nodes that participate in the specific virtual network instance. Designated directory nodes participating in the specific virtual network instance may process the relinquishing message, while other non-designated directory nodes may ignore or discard the relinquishing message. Using FIG. 2A as an example, boundary node B 106, as a designated directory node, may send a relinquishing message within virtual network instance 108*a*. Boundary nodes A and C 106 may ignore or discard the relinquishing message since both boundary nodes 106 are not designated directory nodes. In another embodiment, the relinquishing message may comprise a list of virtual network instances (e.g. virtual network instance #1, virtual network instance #2, etc.) that the node desires to be removed as a designated directory node.

Method 800 then moves to block 806 and determines whether an "okay" message was received from another designated directory node that participates in the specific virtual network instance. After receiving the relinquishing message, other designated directory nodes participating in the specific virtual network instance may send an "okay" message. When the relinquishing message comprises a list of virtual network instances, method 800 may receive multiple "okay" messages from other designated directory nodes that participate in one or more of the virtual network instances listed in the relinquishing message. If method 800 receives one or more "okay" messages, method 800 continues to block 808. However, if method 800 does not receive an okay message, then method 800 moves to block 812.

At block 808, method 800 deletes the address mapping of the end nodes and boundary nodes that participate in the virtual network instance. As discussed in block 806, method 800 may receive more than one "okay" message that corresponds to more than one virtual network instance. Method 800 may delete the mapping entries for each virtual network instance that corresponds to each received "okay" message. For example, a relinquishing message comprises virtual network instance #1, virtual network instance #2, and virtual network instance #3. At block 806, method 800 receives an "okay" message from virtual network instance #1. At block 808, method 800 deletes the mapping entries for virtual network instance #1. Method 800 may then proceed to block 810 and send an announcement message as described in FIG. 6 with an updated list of virtual network instances the node still acts as a designated directory node. Afterwards, method 800 may end.

Returning back to block 812 when method 800 does not receive an "okay" message for the specific virtual network instance listed in the relinquishing message, method 800 may send a "request to offload" message to boundary nodes that participate in the virtual network instance. The "request to offload" message may request other boundary nodes to take over as a designated directory node for a specified network instance. In an embodiment, the "request to offload" message may list more than one virtual network instance that boundary nodes may need to take over as designated directory nodes. Method 800 then proceeds to block 814.

At block 814, method 800 may receive a response message from one or more boundary nodes that are willing to take over the designated directory node role for the specified virtual network instance. Afterwards, method 800 moves to block 816 to send mapping information for the end nodes that participate in the specified virtual network instance. In another embodiment, the boundary nodes willing to take over the designated role may obtain the mapping information for a directory node. Method 800 may then continue to block 816 and receive an announcement message as discussed in FIG. 6 from the boundary nodes willing to take over the designated directory node role. Once a boundary node has obtained the mapping information to become a designated directory node, the boundary node may send an announcement message communicating to the node that boundary node is a designated directory node for the specific virtual network instance. The boundary node may obtain the forwarding information from a directory server and/or from a designated directory node. At that point, method 800 may loop back to 802.

FIG. 9 is a table describing the elements of an embodiment of a virtual network instance priority table 900. As discussed before, a virtual network instance may have one or more designated directory nodes that provide mapping information for the virtual network instance. The designated directory nodes participating in the virtual network instance may have varying priorities in determining whether to maintain the designated directory node role. The assigned priority levels and capability may determine which virtual network instance may be relinquished by a designated directory node. The virtual network instance priority table 900 may be stored within a designated directory node, a directory node, and/or some other network device. In FIG. 9, designated directory node C may relinquish the designated directory node role, while designated directory nodes A and B may not relinquish the designated directory node role. When designated directory node C becomes overloaded, the designated directory node may delete the mapping entries for virtual network instance #1 since a lower priority value and/or "optional to maintain" capability has been assigned for virtual network instance #1.

Virtual network instance priority table 900 may comprise a virtual network instance ID field 902, a designated directory node address field 904, a capability field 906, and a priority field 908. The virtual network instance ID field 902 may indicate the virtual network instance that may comprise one or more designated directory nodes that participate in the virtual network instance. The designated directory node field 904 may indicate the addresses of the designated directory nodes participating in the virtual network instances. In FIG. 9, three designated directory nodes with designated directory node address A, designated directory node address B, and designated directory node address C may participate in virtual network instance #1. The capability field 906 indicates whether the designated directory node needs to maintain a designated directory node role. When the capability equals "must maintain," then designated directory node may not re-assign the designated directory node role to other designated directory nodes and/or boundary nodes. However, when the capability equals "optional to maintain," the designated directory node may relinquish the designated directory node role. As shown in FIG. 9, designated directory node A and B must maintain the designated directory node role, while designated directory node C may have the option to relinquish the designated directory node role. The priority field 908 may indicate the priority of the designated directory node maintaining the designated directory node role. In FIG. 9, "high priority" may be assigned to boundary node A and B, while boundary node C may be assigned a "medium priority."

FIG. 10 is a table describing the elements of an embodiment of a designated directory node priority table 1000. The designated directory node priority table 1000 may comprise a designated directory node address field 1002, a virtual network instance list field 1004, a capability field 1006, and a weight field 1008. The designated directory node address field 1002, a virtual network instance list field 1004, and capability field 1006 may be substantially similar to the designated directory node address field 702, a virtual network instance list field 704, and capability field 706 as described in FIG. 7. Similar to FIG. 7, the designated directory node address B may indicate the address of the node, and virtual network instance #1-#3 may indicate the virtual network instances the node has been selected as a designated directory node. The weight field 1008 may indicate the priority level of maintaining the designated directory node role for the corresponding virtual network instance. The weight may be calculated based on the forwarding capacity and bandwidth of the designated directory node at the virtual network instance. Another embodiment may calculate the weight based on the percentage of end nodes attached to the designated directory node participating in the virtual network instance. The lower the weight value, the less priority is given to the virtual network instance. Similar to the virtual network instance priority table 900, the designated directory node priority table 1000 may be stored within a designated directory node, a directory node, and/or some other network device.

In one embodiment, the weight value for the weight field 1008 may range from 1 to 100, with 100 being the most convenient to forward to end node and one being the least convenient. One way to calculate weight may be to base the weight level on the forwarding capacity and bandwidth of the designated directory node for the virtual network instance. Another embodiment may calculate the weight value based on the percentage of end nodes attached to the designated directory node participating in the virtual network instance. The higher percentage of end nodes attached to a designated directory node, the higher the percentage that the designated directory node may be able to forward a frame directly to a destination within one hop. In FIG. 10, designated directory node A may participate in three virtual network instances. The weight level may be at 50% for virtual network instance #1, 40% for virtual network instance #2, and 10% for virtual network instance #3. Virtual network instance #3 may have the lowest weight and the lowest priority. Hence, when relinquishing the role of designated directory nodes for virtual network instances, designated directory node A may relinquish virtual network instance #3 first before relinquishing virtual network instance #2 and virtual network instance #1.

Figure 11:
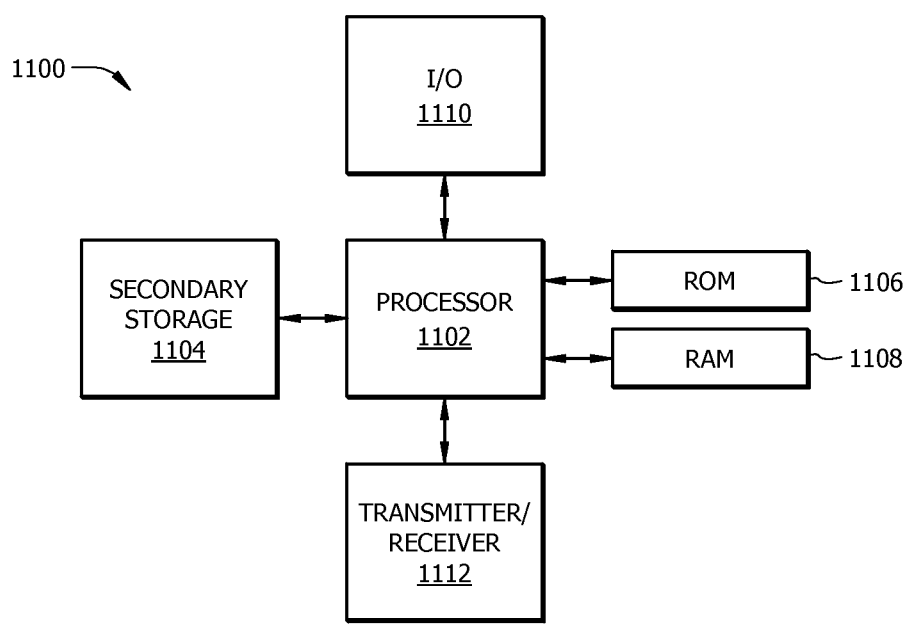
FIG. 11 is a schematic diagram of one embodiment of a general-purpose computer system suitable for implementing the several embodiments of the disclosure.

The schemes described above may be implemented on any general-purpose computer system, such as a computer or network component with sufficient processing power, memory resources, and network throughput capability to handle the necessary workload placed upon it. FIG. 11 illustrates a schematic diagram of a general-purpose computer system 1100 suitable for implementing one or more embodiments of the methods disclosed herein, such as the boundary node 106, the end nodes 108, and directory node 220. The computer system 1100 includes a processor 1102 (which may be referred to as a central processor unit or CPU) that is in communication with memory devices including secondary storage 1104, read only memory (ROM) 1106, random access memory (RAM) 1108, transmitter/receiver 1112, and input/output (I/O) device 1110. Although illustrated as a single processor, the processor 1102 is not so limited and may comprise multiple processors. The processor 1102 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1102 may be configured to implement any of the schemes described herein, such as methods 300, method 350, method 400, and method 800. The processor 1102 may be implemented using hardware, software, or both.

The secondary storage 1104 is typically comprised of one or more disk drives or tape drives and is used for non-volatile storage of data and as an over-flow data storage device if the RAM 1108 is not large enough to hold all working data. The secondary storage 1104 may be used to store programs that are loaded into the RAM 1108 when such programs are selected for execution. The ROM 1106 is used to store instructions and perhaps data that are read during program execution. The ROM 1106 is a non-volatile memory device that typically has a small memory capacity relative to the larger memory capacity of the secondary storage 1104. The RAM 1108 is used to store volatile data and perhaps to store instructions. Access to both the ROM 1106 and the RAM 1108 is typically faster than to the secondary storage 1104. The secondary storage 1104, ROM 1106, and/or RAM 1108 may be non-transitory computer readable mediums and may not include transitory, propagating signals. Any one of the secondary storage 1104, ROM 1106, or RAM 1108 may be referred to as a memory, or these modules may be collectively referred to as a memory. Any of the secondary storage 1104, ROM 1106, or RAM 1108 may be used to store mapping information as described herein. The processor 1102 may generate the mapping information in memory and/or retrieve the mapping information from memory.

The transmitter/receiver 1112 may serve as an output and/or input device of the boundary node 106, the end nodes 108, and directory node 220. For example, if the transmitter/receiver 1112 is acting as a transmitter, it may transmit data out of the computer system 1100. If the transmitter/receiver 1112 is acting as a receiver, it may receive data into the computer system 1100. The transmitter/receiver 1112 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1112 may enable the processor 1102 to communicate with an Internet or one or more intranets. I/O devices 1110 may include a video monitor, liquid crystal display (LCD), touch screen display, or other type of video display for displaying video, and may also include a video recording device for capturing video. I/O devices 1110 may also include one or more keyboards, mice, or track balls, or other well-known input devices.

It is understood that by programming and/or loading executable instructions onto the computer system 1100, at least one of the processor 1102, the RAM 1108, and the ROM 1106 are changed, transforming the computer system 1100 in part into a particular machine or apparatus, e.g., a video codec, having the novel functionality taught by the present disclosure. It is fundamental to the electrical engineering and software engineering arts that functionality can be implemented by loading executable software into a computer, which can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network node comprising:
a processor configured to:
   maintain a plurality of mapping entries for one or more virtual network instances when a number of end nodes in the virtual network instance that are directly connected to the network node exceeds a threshold value;
   receive a data packet destined towards a node within a first virtual network instance, wherein the data packet comprises an inner destination address;
   match the inner destination address with one of the mapping entries to create a matched mapping entry;
   obtain an outer destination address that corresponds to the matched mapping entry;
   encapsulate the data packet with the outer destination address; and
   forward the encapsulated data packet based on the outer destination address,
   wherein the plurality of mapping entries map out all of the addresses for a plurality of end nodes that participate in the first virtual network instance.

2. The network node of claim 1, wherein the processor is further configured to advertise a capability to provide a directory service or a forwarding service for the one or more virtual network instances.

3. The network node of claim 2, wherein the processor is further configured to:
   receive a mapping request message from a first node for the inner destination address within a group of virtual network instances maintained by the network node; and
   forward a mapping of the inner destination address and the outer destination address requested by the mapping request message to the first node.

4. The network node of claim 1, wherein the processor is further configured to advertise a plurality of virtual network instances that the network node maintains mapping entries for.

5. The network node of claim 1, wherein the processor is further configured to advertise a connectivity status for a plurality of connections, wherein the plurality of connections couple the network node to a subset of the plurality of end nodes.

6. The network node of claim 1, wherein the processor is further configured to receive the plurality of mapping entries from a node.

7. The network node of claim 1, wherein the addresses for the plurality of end nodes that participate in the first virtual network instance are mapped to a plurality of boundary nodes configured to communicate with the first virtual network instance and an underlay network.

8. The network node of claim 1, wherein the processor is further configured to advertise a forwarding capability for the one or more virtual network instances.

9. The network node of claim 1, wherein the processor is further configured to delete the mapping entries for the first virtual network instance when a second node has agreed to maintain the mapping entries for the first virtual network instance, and wherein the processor is further configured to not maintain the mapping entries for the end nodes in the first virtual network instance when the number of end nodes in the virtual network instance that are directly connected to the network node is under the threshold value.

10. The network node of claim 1, wherein the processor is further configured to prioritize the virtual network instances that have the mapping entries maintained by the network node.

11. A network node comprising:
maintaining, by a processor of a network node, a plurality of mapping entries for one or more virtual network instances when a number of end nodes in the virtual network instance that are directly connected to the network node exceeds a threshold value;
receiving a data packet destined towards a node within a first virtual network instance, wherein the data packet comprises an inner destination address;
matching the inner destination address with one of the mapping entries to create a matched mapping entry;
obtaining an outer destination address that corresponds to the matched mapping entry;
encapsulating the data packet with the outer destination address; and
forwarding the encapsulated data packet based on the outer destination address,
wherein the plurality of mapping entries map out all of the addresses for a plurality of end nodes that participate in the first virtual network instance.

12. The network node of claim 11, further comprising advertising a capability to provide a directory service or a forwarding service for the one or more virtual network instances.

13. The network node of claim 12, further comprising:
receive a mapping request message from a first node for the inner destination address within a group of virtual network instances maintained by the network node; and
forward a mapping of the inner destination address and the outer destination address requested by the mapping request message to the first node.

14. The network node of claim 11, further comprising advertising a plurality of virtual network instances that the network node maintains mapping entries for.

15. The network node of claim 11, further comprising advertising a connectivity status for a plurality of connections, wherein the plurality of connections couple the network node to a subset of the plurality of end nodes.

16. The network node of claim 11, further comprising receiving the plurality of mapping entries from a node.

17. The network node of claim 11, wherein the addresses for the plurality of end nodes that participate in the first virtual network instance are mapped to a plurality of boundary nodes configured to communicate with the first virtual network instance and an underlay network.

18. The network node of claim 11, further comprising advertising a forwarding capability for the one or more virtual network instances.

19. The network node of claim 11, further comprising:
deleting the mapping entries for the first virtual network instance when a second node has agreed to maintain the mapping entries for the first virtual network instance; and
relinquish maintaining the mapping entries for the end nodes in the first virtual network instance when the number of end nodes in the virtual network instance that are directly connected to the network node is under a certain threshold value.

20. The network node of claim 11, further comprising prioritizing the virtual network instances that have the mapping entries maintained by the network node.

* * * * *